United States Patent [19]

Aikawa

[11] Patent Number: 5,589,533
[45] Date of Patent: Dec. 31, 1996

[54] SELF-CROSSLINKING COMPOSITION, FORMING OBTAINED FROM THE COMPOSITION, AND METHOD FOR MANUFACTURING THE FORMING

[75] Inventor: Satoru Aikawa, Tokyo, Japan

[73] Assignee: Tajima Incorporated, Tokyo, Japan

[21] Appl. No.: 578,239

[22] Filed: Dec. 26, 1995

Related U.S. Application Data

[62] Division of Ser. No. 421,873, Apr. 14, 1995.

[30] Foreign Application Priority Data

May 24, 1994 [JP] Japan ................................ 6-133620

[51] Int. Cl.⁶ .................................................. C08F 8/00
[52] U.S. Cl. ........................ 524/529; 524/533; 524/534; 524/536; 525/301.5; 525/309
[58] Field of Search ................................ 524/529, 533, 524/534, 536

[56] References Cited

U.S. PATENT DOCUMENTS 4,746,695   5/1988   Berly .

FOREIGN PATENT DOCUMENTS

T47622A    3/1989   Hungary .
5-202230   8/1993   Japan .
975761    11/1982   U.S.S.R. .
0711470    7/1954   United Kingdom .
1518324    7/1978   United Kingdom .
2205104   11/1988   United Kingdom .

*Primary Examiner*—Bernard Lipman
*Attorney, Agent, or Firm*—Oliff & Berridge

[57] ABSTRACT

A self-crosslinking composition contains: (a) an oil having an unsaturated fatty acid or an ester of an unsaturated fatty acid as one of its components, (b) a drier, and (c) a polymer or an elastomer that is capable of crosslinking in the absence of a peroxide. A forming (such as a floor tile, a linoleum long floor material, a wall material and a water-proof sheet) may be manufactured by forming and curing the self crosslinking composition and then adding a filler. Since the self-crosslinking composition is capable of crosslinking without using peroxide, the crosslinking reaction is easily conducted without using special equipment to reject air. The composition has a number of advantages over crosslinking methods that use peroxide, including decreased scorch generation, decreased permanent compressive strain, and superior heat resistance and anti-aging resistance. The composition is free from pollution of sulfur and metal and generates no harmful gas during waste incineration. Furthermore, the composition is capable of being blended, formed, and crosslinked under milder conditions than that of conventional methods that use peroxide. The formings show particularly high abrasion resistance, cigarette-proof properties, anti-stain properties, low charge voltages, and high stiffness. Therefore, the formings are suitable for floor tile and linoleum floor material.

1 Claim, 8 Drawing Sheets

SELF-CROSSLINKING COMPOSITION, FORMING OBTAINED FROM THE COMPOSITION, AND METHOD FOR MANUFACTURING THE FORMING

This is a Division of application Ser. No. 08/421,873 filed Apr. 14, 1995.

BACKGROUND OF THE INVENTION

1. Field of the Invention

This invention relates to a self-crosslinking composition, a forming obtained from the composition, and a method for manufacturing the forming. More specifically, this invention relates to a self-crosslinking composition which crosslinks a polymer or elastomer which is crosslinked without using peroxide. According to prior art, a polymer or elastomer is crosslinked using a peroxide under a strict rejection of air. This invention also relates to a forming obtained from the composition, and to a method for manufacturing the forming.

2. Description of Related Art

The method for crosslinking using a peroxide, which is a crosslinking method using no sulfur, is applied to crosslink various types of elastomers and polymers excluding some of the polymers such as polyisobutylene. The crosslinking method using peroxide has the advantages of:

1) decreased scorch occurrence
2) shorter crosslinking time
3) superior in heat resistance and aging resistance
4) less permanent compressive strain, and
5) free from metal contamination caused by sulfur.

There are, however, the disadvantages of:

1) being subjected to the effect of oxygen in air, which effect results in the non-existence of generated radicals, which then results in difficulty for crosslinking,
2) inapplicability of process oil and anti-aging agents because they inhibit the crosslinking action of peroxide, which makes the selection of additives difficult,
3) requiring a strict control of process conditions for conducting the crosslinking operation while rejecting air, (for example, when a Bambury mixer is used for kneading, the decomposition of added peroxide caused by generated heat and the accompanying crosslinking shall be prevented, also when the materials are fed to an extruder, an incorrect condition for treatment results in a solidification of polymer at the die opening, which induces serious trouble.)

SUMMARY OF THE INVENTION

The object of this invention is to provide a novel self-crosslinking composition which has the above-described advantages of the crosslinking method using peroxide to solve the problems of the crosslinking methods using peroxide, and to provide a forming obtained from the composition and a method for manufacturing the forming.

DETAILED DESCRIPTION OF THE INVENTION

The first invention of this application is to provide a self-crosslinking composition which comprises:

(a) an oil containing at least one unsaturated fatty acid and/or its ester, (b) a drier, and (c) at least one polymer and/or elastomer capable of being crosslinked without using peroxide.

The second invention of this application is to provide a forming obtained by forming and crosslinking a self-crosslinking composition which comprises:

(a) an oil containing at least one unsaturated fatty acid and/or its ester, (b) a drier, (c) at least one polymer and/or elastomer capable of being crosslinked without using peroxide, and (d) a filler.

The third invention of this application is to provide a method for manufacturing a forming by: blending (a) an oil containing at least one unsaturated fatty acid and/or its ester, (b) a drier, (c) at least one polymer and/or elastomer capable of being crosslinked without using peroxide, and (d) a filler, to prepare a self-crosslinking composition; forming the self-crosslinking composition into a specific shape at a temperature lower than the crosslinking temperature of the composition; and crosslinking the shape at a temperature higher than the crosslinking temperature of the composition.

Examples of the unsaturated fatty acids of this invention are: the oleic acid series, $C_nH_{2\,n-2}O_2$, such as tiglic acid, hypogaeic acid, oleic acid, lipidic acid, petroselinic acid, erucic acid; the linoleic acid series, $C_nH_{2\,n-4}O_2$, such as linoleic acid, tariric acid; the linolenic acid series, $C_nH_{2\,n-6}O_2$, such as linolenic acid, eleostearic acid, tricosane; and the $C_nH_{2\,n-8}O_2$ series, such as isanic acid and arachidonic acid.

Esters of the above-listed unsaturated fatty acids and alcohols such as methanol, ethanol, propanol, butanol, and glycol, and glycerin may also be used.

Examples of oils containing the above-described unsaturated fatty acid and/or its ester are: dry vegetable oil such as hempseed oil, linseed oil, perille oil, tung oil, walnut oil, poppy seed oil, soya bean oil, and sunflower oil; semi-dry vegetable oils such as mustard oil, sesame oil, corn oil, rapeseed oil, rice oil, and cotton seed oils; processed oil of above-listed oils; and food waste oil.

The term "drier" as used in this invention means one which enhances the oxidation of the above-described oil in air. Examples of the drier are: metallic salts of naphthenic acid, resin acid, and fatty acid, including salts of Co, Ni, Fe, Mn, Zn, Zr, and Pb; oxides of these metals; hydroxides of these metals; or other inorganic salts.

The phrase "polymers and/or elastomers capable of being crosslinked without using peroxide" as used in this invention means those which were crosslinked using peroxide in the prior art, or any other polymer and/or elastomer that is capable of being crosslinked by peroxide. Examples of the polymer and/or elastomer of this type are styrene-butadiene rubber (SBR), styrene-butadieneacrylonitril copolymer (NBR), styrene-butadiene-styrene block copolymer (SBS), styrene-isoprene-styrene block copolymer (SIS), styrene-ethylene-butylene block copolymer (SEBS), ethylene-propylene-diene terpolymer (EPR), ethylene-vinyl acetate copolymer (EVA), ethylene-ethyl acrylate copolymer, low density polyethylene (LDPE), very low density polyethylene (VLDPE), polybutadiene, and 1,2-syndiotactic polybutadiene.

When the above-described polymer or elastomer does not have any double bond within the molecule, and when it gives a low crosslinking efficiency, the main chain may include various types of diene components such as butadiene and divinylbenzene to form 1,2-syndiotactic polybutadiene, for example, and may include a monomer or oligomer having 1 or more functional groups, such as acrylic acid, methacrylic acid, or their esters.

The above-described polymers or elastomers may be used alone or in combination. For the latter case, a polymer of low crosslinking efficiency such as ethylene-vinyl acetate copolymer may be used with one or more polymers of high crosslinking efficiency such as 1,2-syndiotactic polybutadiene, as monomers or as oligomers containing functional groups such as acrylate or methacrylate.

The type of filler used in this invention can be selected depending on the type of target forming and on the type of polymer or elastomer. The filler can be inorganic powder such as calcium carbonate powder, clay powder, silica powder, mica powder, can be organic powder such as wood powder and cork powder, or can be organic or inorganic fibrous powder.

Furthermore, the self-crosslinking composition of this invention can contain other additives than the above-described ones to an extent within the scope of the object of this invention. For example, pigments, lubricants, reinforcing agents, anti-aging agents, fire retardants, and anti-static agents may be added.

A preferred amount of oil of this invention is in a range of from 5 to 20 weight parts (hereinafter referred to simply as "wt.parts") to 100 wt.parts of the crosslinking component (polymer or elastomer), and a preferred adding amount of drier of this invention is in a range of from 0.005 to 1.0 wt.part to 100 wt.parts of the oil. Although the amount of filler used to manufacture the forming may be widely changed depending on the type of forming, it is normally used in a range of from 20 to 500 wt.parts to 100 wt.parts of the crosslinking component.

The crosslinking efficiency E in the presence of the crosslinking component, organic peroxide, and crosslinking agent is expressed by the following equation, $$E = V/2[RO.]$$

where $V$ = mesh-chain concentration (mol/cm$^3$)

$RO.$ = concentration of organic peroxide radical (mol/cm$^3$).

The crosslinking efficiency E becomes 1 when 1 mol of peroxide generates 1 mol of crosslink. The relation between the crosslinking component and the crosslinking efficiency E is given in Table 1.

TABLE 1

| Crosslinking component | Crosslinking efficiency E |
| --- | --- |
| SBR | 12.5 |
| Cis-polybutadiene | 10.5 |
| NR (natural rubber) | 1.0 |
| NBR | 1.0 |
| CR (neoprene) | 0.5 |
| PE | 1.0 |
| EVA (ethylene-vinyl acetate copolymer) | 1.0 |
| EPDM | 1.0–2.5 |
| 1,2-polybutadiene | 90–100 |

Saturated fatty acids or their esters are hard to oxidize at room temperature compared with the unsaturated compounds. Unsaturated compounds themselves, however, are subjected to auto-oxidation following the scheme given below to generate hydroperoxide. The auto-oxidation proceeds at room temperature with a low activation energy.

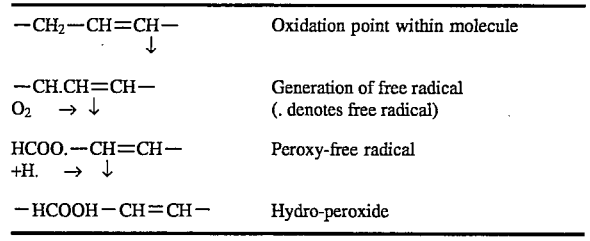

| (Scheme) | |
| --- | --- |
| $-CH_2-CH=CH-$ ↓ | Oxidation point within molecule |
| $-CH.CH=CH-$ $O_2 \rightarrow$ ↓ | Generation of free radical (. denotes free radical) |
| $HCOO.-CH=CH-$ $+H. \rightarrow$ ↓ | Peroxy-free radical |
| $-HCOOH-CH=CH-$ | Hydro-peroxide |

The drier added in this invention presumably generates rapidly radical RO— from hydro-peroxide and further enhances the radical forming reaction.

Radicals thus generated induce the crosslinking reaction of the mixed polymer or elastomer similar to the crosslinking reaction carried by ordinary peroxide. The phenomenon was confirmed by infrared spectroscopy which observed a continuous reduction in a number of double bonds and an increase of the gel formation rate of the self-crosslinking composition of this invention in hot air atmosphere.

The manufacture of the forming of this invention is conducted by, as described before, mixing, forming, and crosslinking (a) oils containing at least one unsaturated fatty acid and/or its ester, (b) a drier, (c) a polymer and/or its elastomer as the crosslinking component, (d) filler, and if necessary, other additives such as pigments and lubricants. In the processing stage, the above-described components may be added succeedingly or one at a time, or two or more may be added followed by mixing with other components. When (a) oil and (b) drier are mixed together in advance and the mixture is mixed with other components, the crosslinking reaction proceeds under a favorable condition. When a mixture of (a) oil and (c) polymer is mixed with a mixture of (b) drier and (d) filler, a more uniform mixture is easily prepared.

For example, the manufacture of forming of this invention is carried out by: preliminarily mixing (a) oil containing unsaturated fatty acid and/or its ester, (b) drier, and (d) filler in a Henschel mixer; mixing the prepared mixture with (c) polymer and/or elastomer as the crosslinking component in a Bambury mixer or the like at a temperature below the crosslinking temperature, or in a range of from 40° to 80° C., for example; forming the mixture to a specific shape using a roller mill or the like; then curing the shape by heating it to the crosslinking temperature, or in a range of from 100° to 140° C. for example, for a sufficient time, or 5 to 15 hrs., for example.

The formings manufactured by the invention are not specifically limited, and they may be a building material such as tile, wall, floor, and water-proof materials. The formings of this invention are particularly suitable for floor tile and linoleum floor material.

As described above, the self-crosslinking composition of this invention enables to crosslink elastomers of diene or non-diene groups and polymers containing many tertiary carbon atoms or alpha-carbon atoms using radicals generated from decomposition of peroxide compounds which are yielded in oil by oxygen in air while using no crosslinking agent nor curing agent and using no special air-rejection equipment.

Other functions and effects of this invention are listed below.

1) In this invention, along with the drier, the oil forms a film on the surface of the self-crosslinking composition. The generated radicals enhance the crosslinking of the polymer or elastomer by rejecting the effect of oxygen in air in a similar manner with the crosslinking by organic peroxide. That is, the crosslinking of the polymer or elastomer is conducted in air without using a crosslinking agent.

2) The curing by hot air in an oven for crosslinking the self-crosslinking composition of this invention forms a stiff film having non-contaminating properties and having a glossy surface. Although the film-forming reaction proceeds at a rather low speed compared with the crosslinking by peroxide, the reaction proceeds under an air-contact condition, and even at a significantly low reaction temperature level.

3) The curing in the hot air described above removes forming deformation generated during the processing and forming stage, and gives less residual strain than that appeared on rubber tile which was formed by a press-forming process and on polyvinyl chloride-tile which was formed by a calendar roll forming. As a result, the curing reduces the generation of shape change with time.

4) The solubility parameter (SP) of oil in this invention is in a range of from 8.4 to 8.6. The SP value of the elastomer and polymer as the crosslinking composition also gives near the range of oil. Therefore, individual components satisfactorily dissolve each other.

5) Some of the antioxidant and anti-aging agents which are contained in the crosslinking polymer or elastomer inhibit conventional crosslinking reactions by peroxide. However, the self-crosslinking composition of this invention is not affected by the above-described anti-aging agent or the like.

6) The formings of this invention show particularly superior abrasion resistance, cigarette proof, stain resistance, and give low charge voltage and high stiffness.

Accordingly, the formings of this invention are suitable for floor tile and linoleum floor material.

DESCRIPTION OF THE PREFERRED EMBODIMENTS

Embodiments of this invention are described below.

(1) A self-crosslinking composition which comprises:
   (a) an oil containing an unsaturated fatty acid and/or its ester,
   (b) a drier, and
   (c) a polymer and/or an elastomer that is capable of being crosslinked in the absence of a peroxide.

(2) A forming obtained by forming and crosslinking a self-crosslinking composition which comprises:
   (a) an oil containing an unsaturated fatty acid and/or its ester,
   (b) a drier,
   (c) a polymer and/or an elastomer that is capable of being crosslinked in the absence of a peroxide, and
   (d) a filler.

(3) A method for manufacturing a forming by: blending
   (a) an oil containing an unsaturated fatty acid and/or its ester,
   (b) a drier,
   (c) a polymer and/or an elastomer that is capable of being crosslinked in the absence of a peroxide, and
   (d) a filler, to prepare a self-crosslinking composition; forming the self-crosslinking composition into a specific shape at a temperature lower than the crosslinking temperature of the composition; and crosslinking the shape at a temperature higher than the crosslinking temperature of the composition.

(4) A tile, for example a floor tile, obtained by forming and crosslinking a self-crosslinking composition which comprises:
   (a) an oil containing an unsaturated fatty acid and/or its ester,
   (b) a drier,
   (c) a polymer and/or an elastomer that is capable of being crosslinked in the absence of a peroxide, and
   (d) a filler (for example, calcium carbonate).

(5) A method for manufacturing a tile, for example a floor tile, by: blending
   (a) an oil containing an unsaturated fatty acid and/or its ester,
   (b) a drier,
   (c) a polymer and/or an elastomer that is capable of being crosslinked in the absence of a peroxide, and
   (d) a filler (for example, calcium carbonate), to prepare a self-crosslinking composition; forming the self-crosslinking composition into a specific shape at a temperature lower than the crosslinking temperature of the composition; and crosslinking the shape at a temperature higher than the crosslinking temperature of the composition.

This invention is described in more detail in the following embodiments. Nevertheless, the scope of this invention is not limited by the embodiments. The symbol "%" in the embodiments designates "wt. %" unless otherwise specified.

EXAMPLE 1

Figure 1:
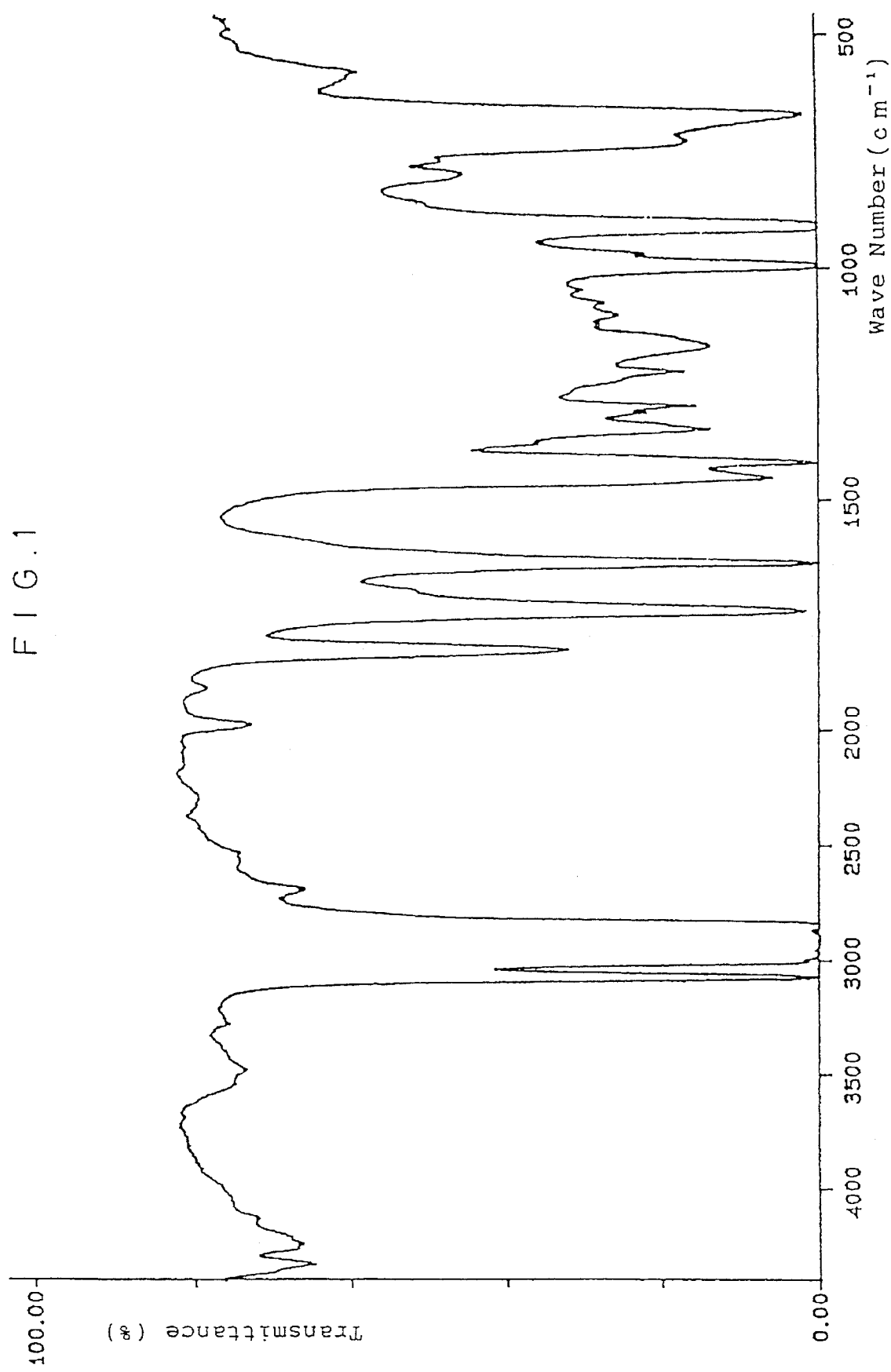
FIG. 1 is a chart showing infrared absorption spectra of a composition before heating prepared in Example 1.
Figure 2:
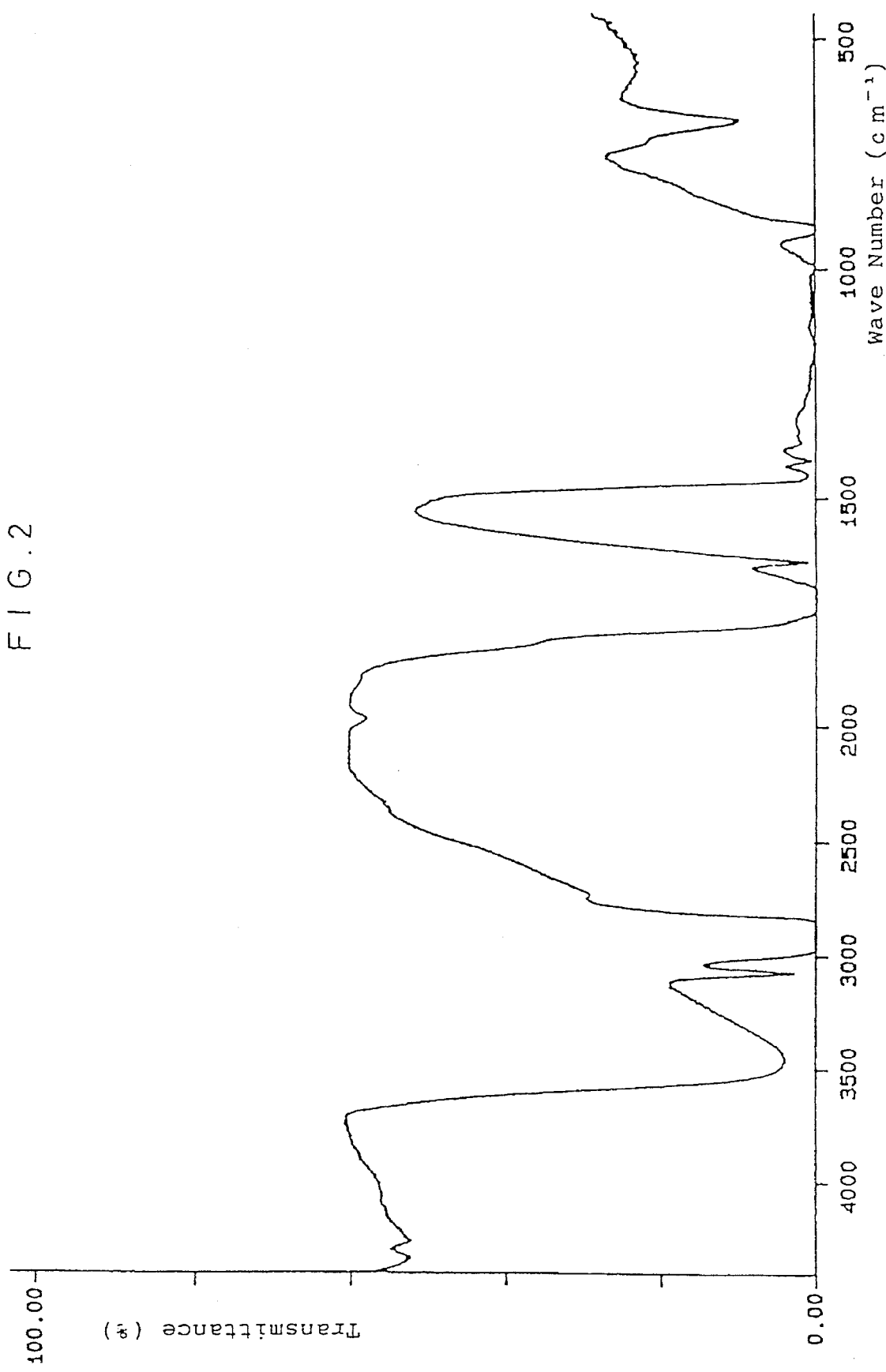
FIG. 2 is a chart showing infrared absorption spectra of the composition of Example 1 after heating to 100° C. for 10 hrs.

A 8.5 g of 1,2-syndiotactic polybutadiene (RB810; supplied by Japan Synthetic Rubber Co.) and 1.5 g of boiled oil prepared from soya bean oil containing 0.01% of cobalt naphthenate were dissolved to 20 ml of toluol. From the prepared solution, a film having a thickness ranging from 0.05 to 0.1 mm was formed using the flow-and-spreading method. The film was then heated in an oven at 100° C. for 10 hrs. Infrared absorption spectrometry and extraction tests were applied to the film before and after the heating. The extraction test was conducted by placing the film and toluol as the solvent into a Soxhlet extractor, by processing the content for 8 hrs, then by determining the insoluble matter. FIG. 1 is a chart showing infrared absorption spectra of the composition (film) before heating, and FIG. 2 is a chart showing infrared absorption spectra of the composition after heating at 100° C. for 10 hrs. From these figures, it was confirmed that the heating reduced the absorption band of double bond. The content of insoluble matter in the composition (film) after heating at 100° C. for 10 hrs. was 95%.

EXAMPLE 2

Figure 3:
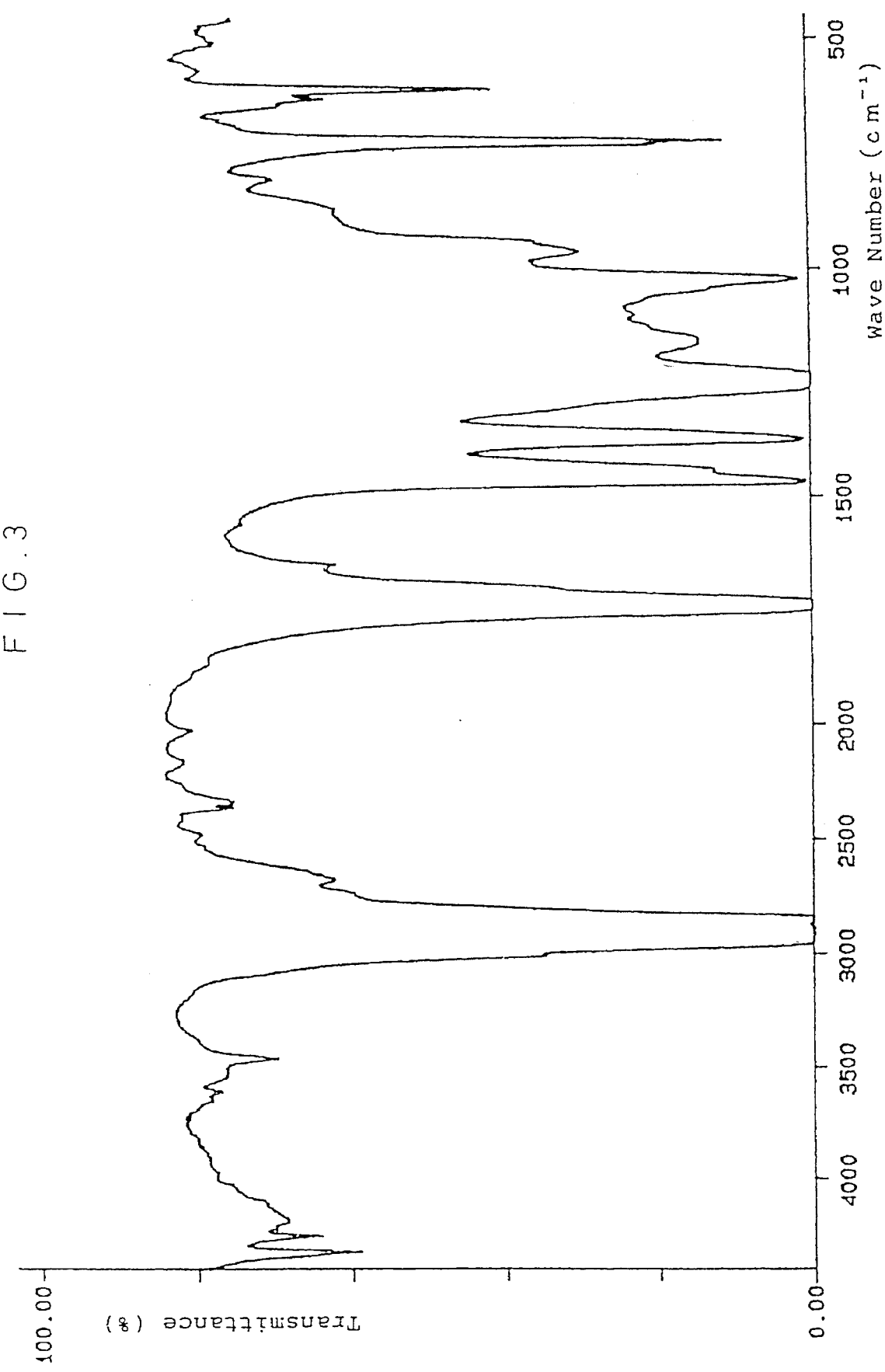
FIG. 3 is a chart showing infrared absorption spectra of a composition before heating prepared in Example 2.
Figure 4:
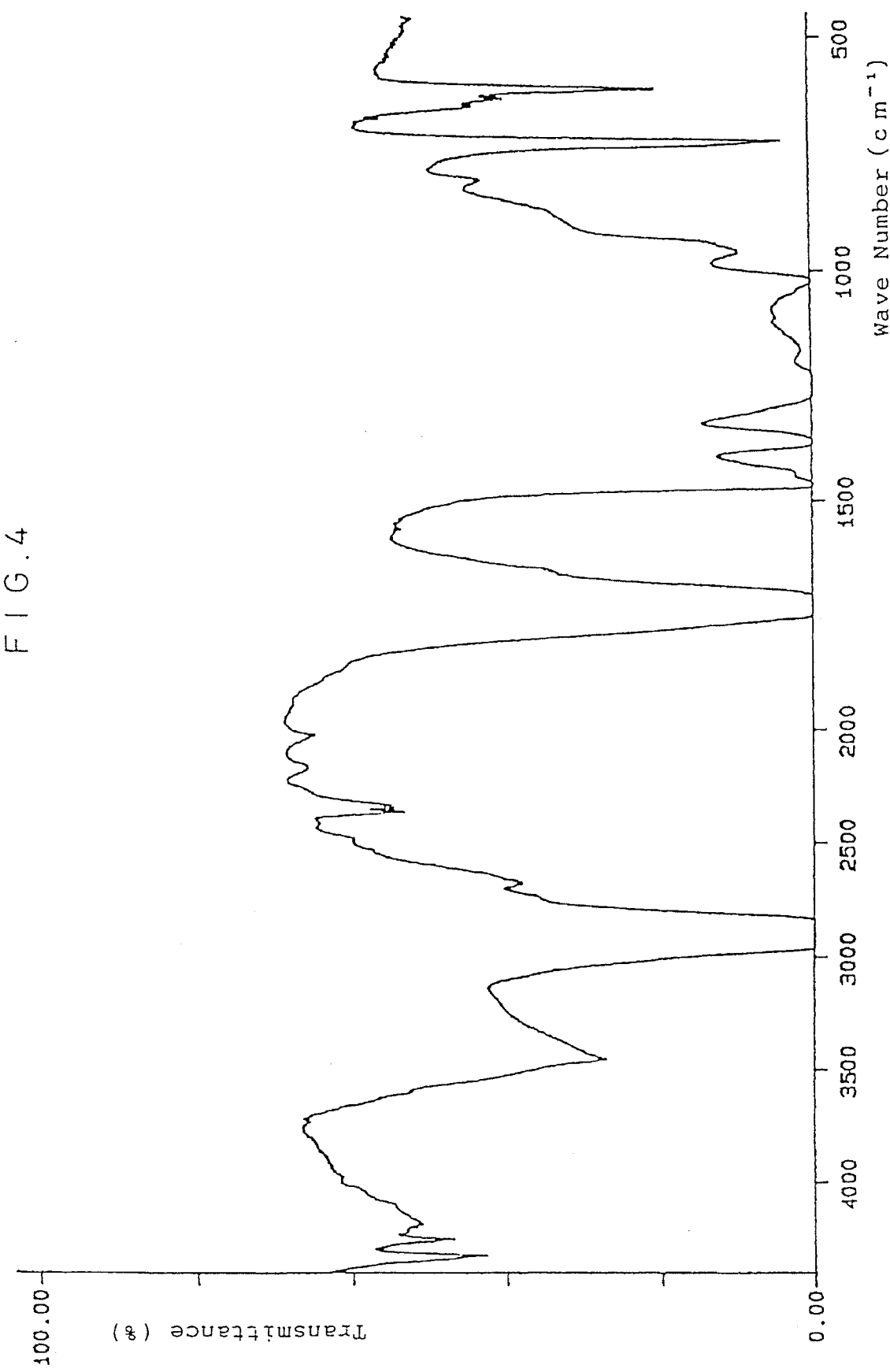
FIG. 4 is a chart showing infrared absorption spectra of the composition of Example 2 after heating to 120° C. for 10 hrs.

A film was prepared applying a similar procedure to Example 1 using 8.5 g of ethylene-vinyl acetate copolymer (containing 25% of vinyl acetate) (V505; supplied by Mitsubishi Petrochemical Co.) and 1.5 g of boiled oil described in Example 1. The film was heated in an oven at 120° C. for 10 hrs. Infrared absorption spectrometry was applied before and after the heating. FIG. 3 and FIG. 4 show the infrared absorption spectra of the composition before and after the heating, respectively. From these figures, it was confirmed that the heating reduced the absorption band of double bond.

EXAMPLE 3

Figure 5:
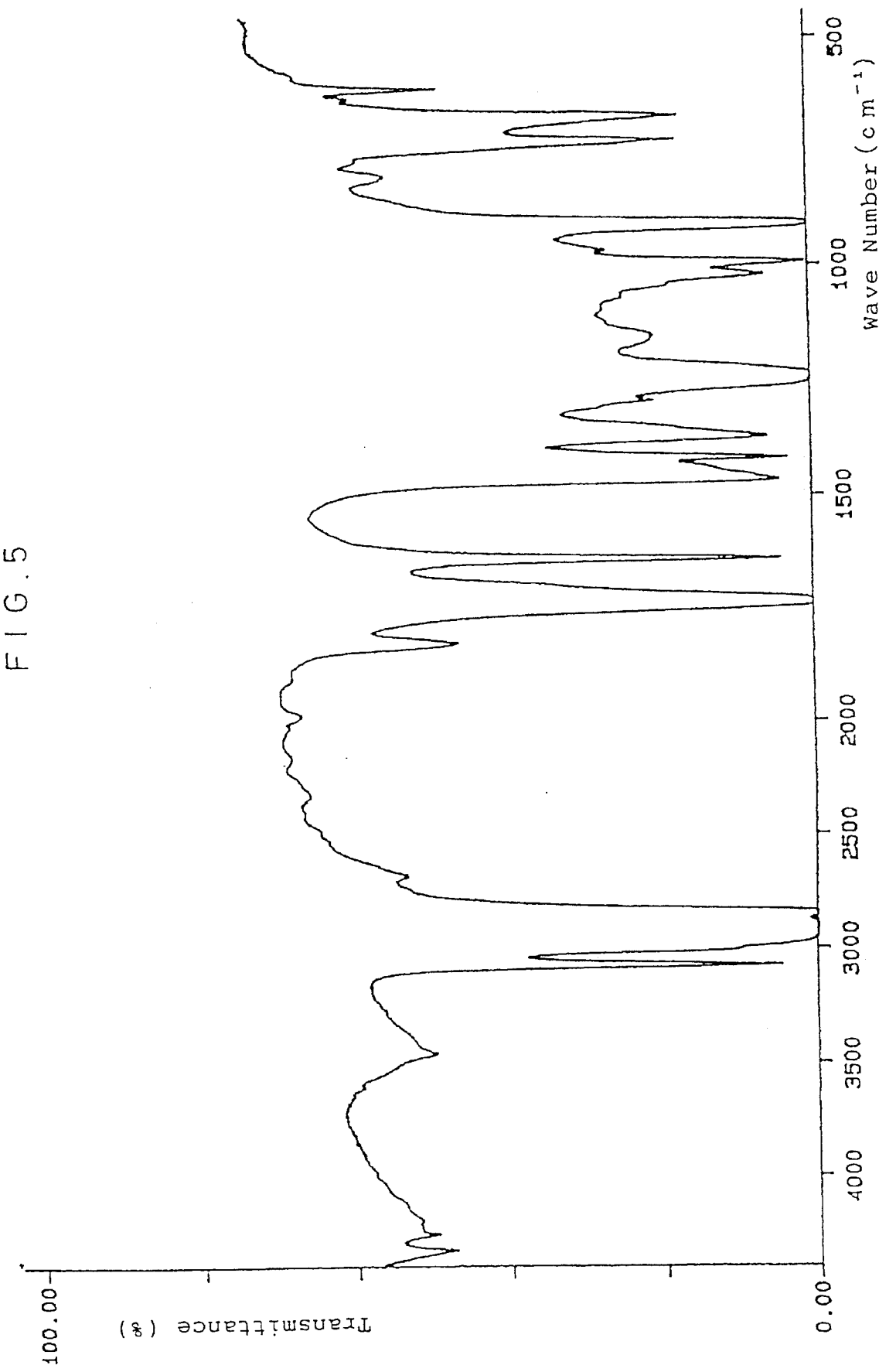
FIG. 5 is a chart showing infrared absorption spectra of the composition of Example 3 after heating to 100° C. for 2 hrs.
Figure 6:
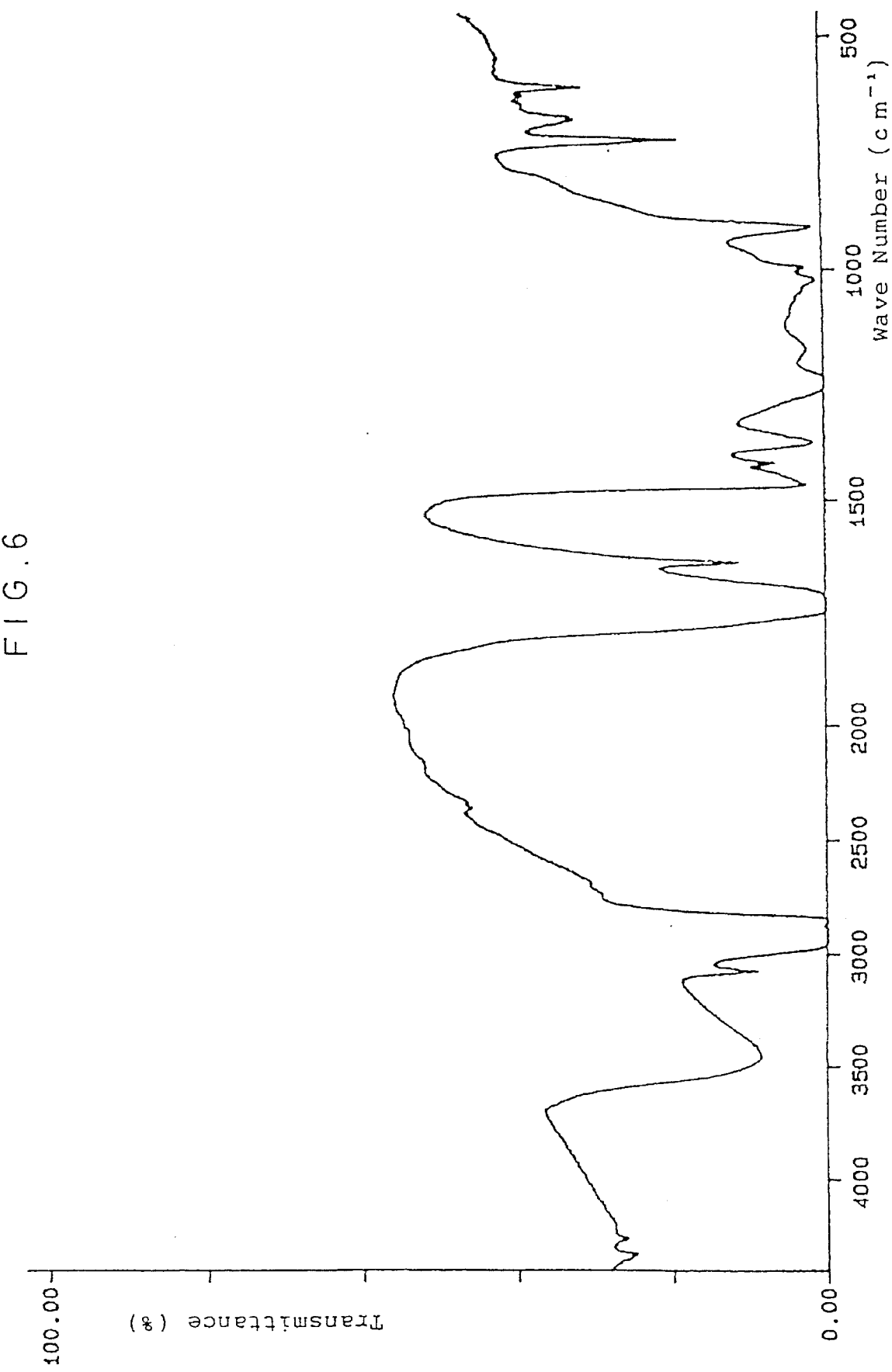
FIG. 6 is a chart showing infrared absorption spectra of the composition of Example 3 after heating to 100° C. for 10 hrs.

A film was prepared applying a similar procedure to Example 1 using 4.5 g of ethylene-vinyl acetate copolymer (containing 25% of vinyl acetate) (V505; supplied by Mitsubishi Petrochemical Co.), 4.5 g of 1,2-syndiotactic polybutadiene (RB810; supplied by Japan Synthetic Rubber Co.), and 1 g of boiled oil described in Example 1. The film was heated in an oven at 100-C. for 10 hrs. Infrared absorption spectrometry was applied to the film during and after the heating. FIG. 5 and FIG. 6 show the infrared absorption spectra of the composition after 2 hrs. of heating and after 10 hrs. of heating, respectively. From these figures, it was confirmed that the heating reduced the absorption band of double bond with time. The content of insoluble matter in the composition (film) after heating at 100° C. for 10 hrs. was 57%. (The applied extraction test was the same as in Example 1.)

EXAMPLE 4

Figure 7:
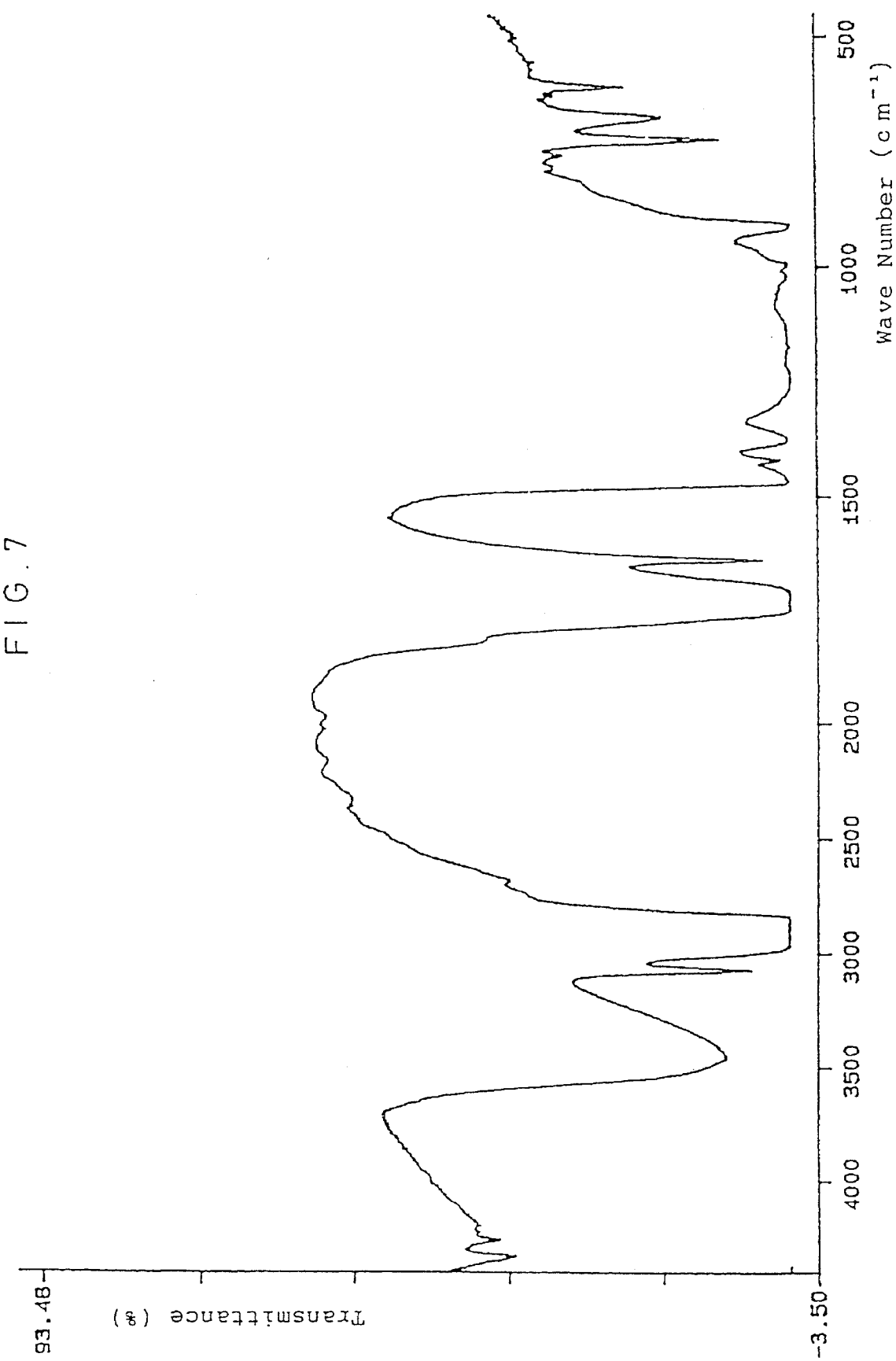
FIG. 7 is a chart showing infrared absorption spectra of the composition of Example 4 after heating to 100° C. for 2 hrs.
Figure 8:
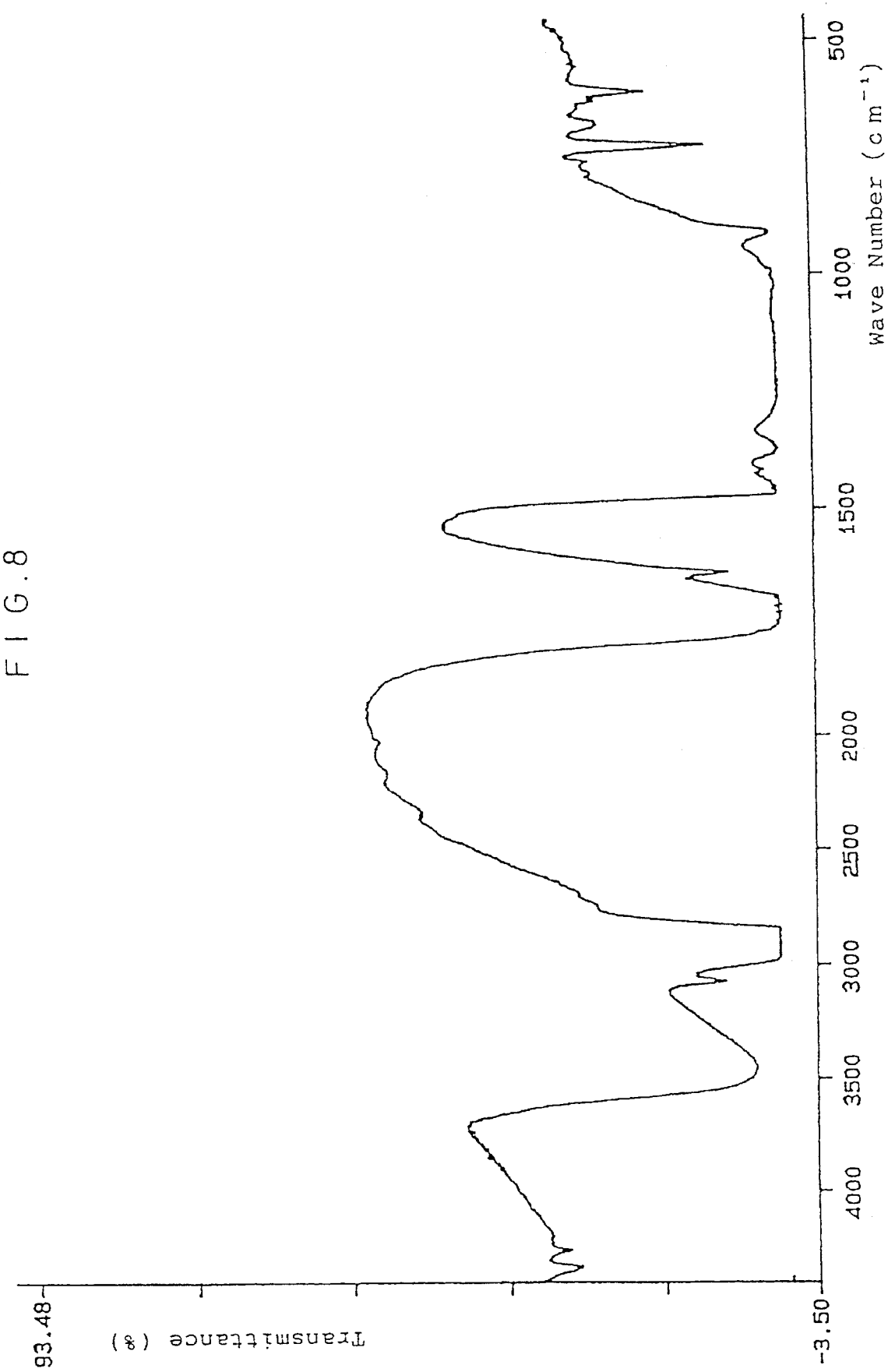
FIG. 8 is a chart showing infrared absorption spectra of the composition of Example 4 after heating to 100° C. for 10 hrs.

A film was prepared applying similar procedure to Example 1 using 4 g of ethylene-vinyl acetate copolymer (containing 25% of vinyl acetate) (V505; supplied by Mitsubishi Petrochemical Co.), 4 g of 1,2-syndiotactic polybutadiene (RB810; supplied by Japan Synthetic Rubber Co.), 1 g of boiled oil described in Example 1, and 1 g of trimethylol propane tri-methacrylate (TMPT). The film was heated in a similar manner to Example 1. Infrared absorption spectrometry and extraction tests were applied to the film. FIG. 7 is a chart showing infrared absorption spectra of the composition after 2 hrs. of heating at 100° C. and FIG. 8 is a chart showing infrared absorption spectra of the composition after 10 hrs. of heating at 100° C. From these figures, it was confirmed that the heating reduced the absorption band of double bond with time. The content of insoluble matter in the composition after heating at 100° C. for 10 hrs. was 71%.

EXAMPLE 5

A film was prepared applying similar procedure to Example 1 using 4 g of VLDPE (Tafmer P068; supplied by Mitsui Petrochemical Industries, Ltd.), 4 g of 1,2-syndiotactic polybutadiene (RB810; supplied by Japan Synthetic Rubber Co.), 1 g of boiled oil described in Example 1, and 1 g of TMPT. The film was heated in a similar manner to Example 1. Infrared absorption spectrometry and extraction tests were applied to the film.

From the analytical results, it was confirmed that the heating reduced the absorption band of double bond with time, (charts are not shown). The content of insoluble matter in the composition after heating was 55.4%. When a composition comprising 8 g of VLDPE, 1 g of boiled oil described in Example 1, and 1 g of TMPT was used, the content of insoluble matter became 14.3%. Consequently, the effect of the addition of 1,2-syndiotactic polybutadiene having the crosslinking efficiency of 90 to 100% was confirmed.

From the above results, it was understood that the use of 1,2-syndiotactic polybutadiene having a high crosslinking efficiency provides a high curing speed (crosslinking speed) and that the use of ethylene-vinyl acetate copolymer having a low crosslinking efficiency results in a small insoluble matter content and a slow curing speed. However, it was also confirmed that the coexistence of 1,2-syndiotactic polybutadiene, further with acrylate and methacrylate which contain 1 through 4 functional groups accelerates the crosslinking reaction.

EXAMPLE 6

A floor tile having the following composition was manufactured.

| | |
|---|---|
| 1,2-syndiotactic polybutadiene (RB801; supplied by Japan Synthetic Rubber Co.) | 14% |
| Butadiene rubber (BR01; supplied by Japan Synthetic Rubber Co.) | 2% |
| Soya bean oil (boiled oil containing 0.02% of cobalt naphthenate) | 2% |
| Trimethylol propane methacrylate (TMPT) | 2% |
| Calcium carbonate powder (under 150 mesh) | 63% |
| Silicate (Wollastonite) | 10% |
| Organic fiber reinforcing material (Santweb; supplied by Monsanto) | 4% |
| Titanium white, other pigment | 3% |
| Glycerin monostearate lubricant | 0.5% |

The above-listed components except 1,2-syndiotactic polybutadiene and butadiene rubber were preliminarily mixed in a Henschel mixer. After weighing the mixture, they were charged into a Bambury mixer along with 1,2-syndiotactic polybutadiene and butadiene rubber. They were blended at a temperature range of from 50° to 60° C. for 3 min., then they were discharged (at the material temperature of about 90° to 100 ° C.). Then, the mixture was rolled by a mixing rolls, embossing roll calendar rolls to form a shape having a specific thickness. The shape was cut and was put into an oven to cure at a temperature range of from 110° to 120° C. for 10 to 12 hrs. After taking out the cured material, it was cut to a specific size to obtain the floor tile product.

EXAMPLE 7

A floor tile having the composition listed below was manufactured following the similar procedure of Example 6.

| | |
|---|---|
| 1,2-syndiotactic polybutadiene (RB810; supplied by Japan Snythetic Rubber Co.) | 12.0% |
| Ethylene-vinyl acetate copolymer (containing 25% of vinyl acetate) (V505; supplied by Mitsubishi | 13.5% |

| | |
|---|---|
| Petrochemical Co.) | |
| Soya bean oil (boiled oil containing 0.02% of cobalt naphthenate) | 3.0% |
| TMPT | 1.5% |
| Fired clay (Translink#37; supplied by Engelhard Minerats) | 10.0% |
| Water-containing silicate powder (Nipseal VN3; supplied by Nippon Silica Co.) | 3.0% |
| Precipitated calcium carbonate treated by resin acid (Hakuenka 0; supplied by Shiraishi Calcium Co.) | 5.0% |
| Ground calcium carbonate powder (−150 mesh) | 49.0% |
| Pigment | 3.0% |

The floor tile manufactured in Example 7 gave rubber tile touch, and showed the following properties.

| | |
|---|---|
| Specific gravity | 1.71 g/cm³ |
| Residual dent | 6.1% |
| Macburney dent | |
| 20° C. | 0.46 mm |
| 45° C. | 0.69 mm |
| Taber type abrasion tester (conforming to JIS K7204) | |
| Test condition - H-18; | load of 1 kg; 1000 rpm |
| Abraded weight of 0.33 g; | abraded thickness of 0.07 mm |
| Cigarette proof | Favorable |
| Anti-stain property | Excellent |
| Charge voltage | 150 V (Floor polishing charge tester*, 20° C., 40% humidity) |
| Touch | Flexibility and elasticity resemble rubber tile |

(*) Floor polishing charge tester is a charge tester which determines static charge potential generated during mechanical rubbing of the work (floor tile in this case) with a rubber roller. A conventional polyvinyl chloride composition called the "P-tile" was tested on the floor polishing charge tester under the condition described above, and the charge voltage was 1735 V.

EXAMPLE 8

Cork powder, wood powder, and organic fiber are mixed to a binder at a blending temperature of 90° to 100° C. without damaging the composition. For example, a floor tile having the following-listed components was manufactured.

| | |
|---|---|
| 1,2-syndiotactic polybutadiene (RB810; supplied by Japan Synthetic Rubber Co.) | 13.0% |
| Butadiene rubber (BR01; supplied by Japan Synthetic Rubber Co.) | 2.0% |
| Soya bean oil (boiled oil containing 0.02% of cobalt naphthenate) | 4.0% |
| TMPT | 2.0% |
| Silicate (Wollastonite) | 10.0% |
| Cork powder (FPF −200 mesh) | 7.0% |
| Ground calcium carbonate powder (−150 mesh) | 62.0% |

The above-listed components except 1,2-syndiotactic polybutadiene and butadiene rubber were preliminarily mixed in a Henschel mixer. After weighing the mixture, they were charged into a Bambury mixer along with 1,2-syndiotactic polybutadiene and butadiene rubber. They were blended at a temperature range of from 90° to 100° C. for 3 min., then they were discharged. Then, the mixture was rolled by a mixing rolls, embossing roll calendar rolls to form a shape having a specific thickness. The shape was cut and was put into an oven to cure at a temperature range of from 110° to 120° C. for 10 to 12 hrs. After taking out the cured material, it was cut to a specific size by punching machine to obtain the floor tile product. The floor tile showed the properties given below. When the content of soya bean oil exceeded 20%, the obtained tile had an enhanced odor of fatty acid.

| | |
|---|---|
| Specific gravity | 1.60 g/cm³ |
| Residual dent | 8.8% |
| Change in water-absorbing length (%) | |

+0.07% (X: along the calendar flow direction)
+0.07% (Y: lateral to the calendar flow direction)
Taber type abrasion tester (conforming to JIS K7204)
Test condition - H-18; load of 1 kg; 1000 rpm
Abraded weight of 1.28 g; abraded thickness of 0.31 mm

| | |
|---|---|
| Static charge | 200–300 V (Floor polishing charge tester, 20° C., 40% humidity) |
| Anti-stain property | Excellent |
| Stiffness | Determined by Taber type abrasion tester. |

Result is summarized in Table 2.

TABLE 2

Result of stiffness measurement

| | Stiffness | |
|---|---|---|
| Temperature | X: direction of calendar flow | Y: lateral to calendar flow direction |
| 5 | 6995 | 6652 |
| 20 | 2612 | 2261 |
| 35 | 2022 | 1902 |

EXAMPLE 9

A linoleum long floor material having the composition listed below was manufactured.

| | |
|---|---|
| 1,2-syndiotactic polybutadiene (RB810; supplied by Japan Synthetic Rubber Co.) | 9.0% |
| Ethylene-vinyl acetate copolymer (containing 25% of vinyl acetate) (V505; supplied by Mitsubishi Petrochemical Co.) | 16.5% |
| Boiled oil (soya bean oil containing 0.02% of cobalt naphthenate and 0.02% of zinc naphthenate) | 3.0% |
| TMPT | 1.5% |
| Water-containing silicate powder (Nipseal VN3; supplied by Nippon Silica Co.) | 3.0% |
| Fired clay (Translink#37; supplied by Engelhard Minerats) | 20.0% |
| Precipitated calcium carbonate treated by resin acid (Hakuenka 0; supplied by Shiraishi Calcium Co.) | 5.0% |
| Calcium carbonate heavy powder (−150 mesh) | 29.0% |
| Cork particle (P-3, European normal) | 10.0% |
| Pigment | 3.0% |

The above-listed components were mixed in a Bambury mixer to form square pellets having the size of 3×3 mm. The pellets were heated by hot air to 90° to 100° C., then they were supplied to a calendar roll machine to press-weld them to a Tetron nonwoven fabric or a victoria lawn which was treated by SBR latex. The treated fabric was hung down from louver passing through an oven to cure at 120° to 130° C. for 12 to 14 hrs.

Thus obtained linoleum long floor material showed the following properties.

| | |
|---|---|
| Specific gravity | 1.31 g/cm³ |
| Residual dent | 15% |
| Change in water-absorbing length | |

+0.13% (X: along the calendar flow direction)
+0.11% (Y: lateral to the calendar flow direction)
Taber type abrasion tester (conforming to JIS K7204)
Test condition - H-18; load of 1 kg; 1000 rpm

| | |
|---|---|
| Abraded weight of 1.50 g | |
| Cigarette proof property | Favorable to similar degree with ordinary linoleum |
| Anti-stain property | Excellent |
| Static charge | 98 V (Floor polishing charge tester, 27° C., 21% humidity) |

We claim:

1. A method for manufacturing a forming of floor material comprising blending:

(a) a vegetable oil having at least one unsaturated fatty acid or an ester of an unsaturated fatty acid as one of its components;

(b) a drier;

(c) at least one member that is capable of being crosslinked in the absence of a peroxide, wherein said member is selected from the group consisting of styrene-butadiene rubber, styrene-butadiene-acrylonitrile copolymer, styrene-butadiene-styrene block copolymer, styrene-isoprene-styrene block copolymer, styrene-ethylene-butylene block copolymer, ethylene-propylene-diene terpolymer, ethylene-vinyl acetate copolymer, ethylene-ethyl acrylate copolymer, low density polyethylene, very low density polyethylene, polybutadiene, and 1,2-syndiotactic polybutadiene; and (d) a filler; to prepare a self-crosslinking composition which is free of a solvent and free of a crosslinking agent, wherein said self-crosslinking occurs at a crosslinking temperature;

forming said self-crosslinking composition into a specific shape at a first temperature lower than said crosslinking temperature; and crosslinking said shape at a second temperature higher than said crosslinking temperature.

* * * * *

UNITED STATES PATENT AND TRADEMARK OFFICE
CERTIFICATE OF CORRECTION

PATENT NO. : 5,589,533
DATED : December 31, 1996
INVENTOR(S) : Satoru AIKAWA et al.

It is certified that error appears in the above-indentified patent and that said Letters Patent is hereby corrected as shown below:

On the title page, item [75] should read:
    Satoru Aikawa; Eiichi Tajima, both of Tokyo, Japan.

Signed and Sealed this

Eighteenth Day of March, 1997

Attest:

BRUCE LEHMAN

*Attesting Officer*      *Commissioner of Patents and Trademarks*